(12) United States Patent
Xu et al.

(10) Patent No.: US 8,688,873 B2
(45) Date of Patent: Apr. 1, 2014

(54) SYSTEMS AND METHODS FOR MONITORING OUT OF ORDER DATA DECODING

(75) Inventors: Changyou Xu, Fremont, CA (US); Shaohua Yang, Santa Clara, CA (US); Kapil Gaba, Fremont, CA (US)

(73) Assignee: LSI Corporation, San Jose, CA (US)

( * ) Notice: Subject to any disclaimer, the term of this patent is extended or adjusted under 35 U.S.C. 154(b) by 1128 days.

(21) Appl. No.: 12/651,254

(22) Filed: Dec. 31, 2009

(65) Prior Publication Data

US 2011/0161633 A1  Jun. 30, 2011

(51) Int. Cl.
*G06F 3/00* (2006.01)
*G06F 5/00* (2006.01)

(52) U.S. Cl.
USPC ............................................. 710/55

(58) Field of Classification Search
USPC ........... 710/5, 7, 8, 15, 16, 17, 18, 19, 20, 55; 370/394
See application file for complete search history.

(56) References Cited

U.S. PATENT DOCUMENTS

| | | |
|---|---|---|
| 5,278,846 A | 1/1994 | Okayama et al. |
| 5,325,402 A | 6/1994 | Ushirokawa |
| 5,392,299 A | 2/1995 | Rhines et al. |
| 5,513,192 A | 4/1996 | Janku et al. |
| 5,612,964 A | 3/1997 | Haraszti |
| 5,701,314 A | 12/1997 | Armstrong et al. |
| 5,717,706 A | 2/1998 | Ikeda |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,097,764 A | 8/2000 | McCallister et al. |

(Continued)

FOREIGN PATENT DOCUMENTS

| | | |
|---|---|---|
| WO | WO 2006/016751 | 2/2006 |
| WO | WO 2006/091797 | 8/2007 |

OTHER PUBLICATIONS

Casado et al., Multiple-rate low-density parity-check codes with constant blocklength, IEEE Transations on Communications, Jan. 2009, vol. 57, pp. 75-83.

(Continued)

*Primary Examiner* — Chun-Kuan Lee
(74) *Attorney, Agent, or Firm* — Hamilton DeSanctis & Cha

(57) ABSTRACT

Various embodiments of the present invention provide systems and methods for monitoring out of order data decoding. For example, a method for monitoring out of order data processing is provided that includes receiving a plurality of data sets that is associated with a plurality of identifiers with each of the plurality of identifiers indicates a respective one of the plurality of data sets; storing each of the plurality of identifiers in a FIFO memory in an order that the corresponding data sets of the plurality of data sets was received; processing the plurality of data sets such that at least one of the plurality of data sets is provided as an output data set; accessing the next available identifier from the FIFO memory; and asserting an out of order signal when the next available identifier is not the same as the identifier associated with the output data set.

20 Claims, 5 Drawing Sheets

(56) References Cited

U.S. PATENT DOCUMENTS

| | | | |
|---|---|---|---|
| 6,216,251 B1 | 4/2001 | McGinn | |
| 6,266,795 B1 | 7/2001 | Wei | |
| 6,317,472 B1 | 11/2001 | Choi et al. | |
| 6,351,832 B1 | 2/2002 | Wei | |
| 6,377,610 B1 | 4/2002 | Hagenauer et al. | |
| 6,438,717 B1 | 8/2002 | Butler et al. | |
| 6,473,878 B1 | 10/2002 | Wei | |
| 6,574,191 B1 * | 6/2003 | Usukura et al. | 370/216 |
| 6,625,775 B1 | 9/2003 | Kim | |
| 6,671,404 B1 | 12/2003 | Kawatani et al. | |
| 6,748,034 B2 | 6/2004 | Hattori et al. | |
| 6,757,862 B1 | 6/2004 | Marianetti | |
| 6,781,981 B1 * | 8/2004 | Kimbrough | 370/352 |
| 6,788,654 B1 | 9/2004 | Hashimoto et al. | |
| 6,810,502 B2 | 10/2004 | Eidson | |
| 6,826,157 B1 * | 11/2004 | Davis et al. | 370/252 |
| 6,986,098 B2 | 1/2006 | Poeppelman | |
| 7,010,051 B2 | 3/2006 | Murayama et al. | |
| 7,047,474 B2 | 5/2006 | Rhee et al. | |
| 7,058,873 B2 | 6/2006 | Song et al. | |
| 7,093,179 B2 | 8/2006 | Shea | |
| 7,184,486 B1 | 2/2007 | Wu et al. | |
| 7,191,378 B2 | 3/2007 | Eroz et al. | |
| 7,203,887 B2 | 4/2007 | Eroz et al. | |
| 7,257,764 B2 | 8/2007 | Suzuki et al. | |
| 7,310,768 B2 | 12/2007 | Eidson et al. | |
| 7,509,562 B1 * | 3/2009 | Esposito et al. | 714/775 |
| 2002/0071421 A1 * | 6/2002 | Chiu et al. | 370/349 |
| 2004/0024907 A1 * | 2/2004 | Chapman et al. | 709/248 |
| 2004/0095964 A1 * | 5/2004 | Meylan et al. | 370/506 |
| 2004/0098659 A1 | 5/2004 | Bjerke et al. | |
| 2005/0216819 A1 | 9/2005 | Chugg et al. | |
| 2005/0273688 A1 | 12/2005 | Argon | |
| 2006/0020872 A1 | 1/2006 | Richardson et al. | |
| 2006/0031737 A1 | 2/2006 | Chugg et al. | |
| 2006/0140311 A1 | 6/2006 | Ashley et al. | |
| 2006/0168493 A1 | 7/2006 | Song et al. | |
| 2006/0195772 A1 | 8/2006 | Graef et al. | |
| 2006/0248435 A1 | 11/2006 | Haratsch | |
| 2007/0011569 A1 | 1/2007 | Vila Casado et al. | |
| 2007/0047635 A1 | 3/2007 | Stojanovic et al. | |
| 2007/0286270 A1 | 12/2007 | Huang et al. | |
| 2008/0049825 A1 | 2/2008 | Chen et al. | |
| 2008/0168330 A1 | 7/2008 | Graef et al. | |
| 2010/0329272 A1 * | 12/2010 | Tsuboi et al. | 370/401 |

OTHER PUBLICATIONS

Collins and Hizlan, "Determinate State Convolutional Codes" IEEE Transactions on Communications, Dec. 1993.

Eleftheriou, E. et al., "Low Density Parity Check Codes for Digital Subscriber Lines", Proc ICC 2002, pp. 1752-1757.

Han and Ryan, "Pinning Techniques for Low-Floor Detection/Decoding of LDPC-Coded Partial Response Channels", 5th International Symposium on Turbo Codes &Related Topics, 2008.

Mohsenin et al., "Split Row: A Reduced Complexity, High Throughput LDPC Decoder Architecture", pp. 1-6, printed from www.ece.ucdavis.edu on Jul. 9, 2007.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Yeo et al., "VLSI Architecture for Iterative Decoders in Magnetic Storage Channels", Mar. 2001, pp. 748-755, IEEE trans. Magnetics, vol. 37, No. 2.

Zhong et al., "Area-Efficient Min-Sum Decoder VLSI Architecture for High-Rate QC-LDPC Codes in Magnetic Recording", pp. 1-15, Submitted 2006, not yet published.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC TECHRON, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

Zhong, "Block-LDPC: A Practical LDPC Coding System Design Approach", IEEE Trans. on Circuits, Regular Papers, vol. 5, No. 4, pp. 766-775, Apr. 2005.

* cited by examiner

SYSTEMS AND METHODS FOR MONITORING OUT OF ORDER DATA DECODING

BACKGROUND OF THE INVENTION

The present inventions are related to systems and methods for monitoring and/or reporting status related to out of order data processing, and more particularly to systems and methods for monitoring and/or reporting status related out of order data decoding.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any data losses caused by various factors. In some cases, an encoding/decoding process is used to enhance the ability to detect a data error and to correct such data errors. As an example, a simple data detection and decode may be performed, however, such a simple process often lacks the capability to converge on a corrected data stream.

To heighten the possibility of convergence, various existing processes utilize two or more guaranteed detection and decode iterations. Such an approach assures that at least two detection and decoding processes are applied to each presented data set. However, such an approach absolutely requires two iterations for each input data set that is introduced. This may waste significant power and introduce unnecessary latency where the input is capable of converging in a single iteration. Further, in some cases two iterations is insufficient to result in a convergence. Thus, such an approach is both wasteful in some conditions and insufficient in other conditions.

Hence, for at least the aforementioned reasons, there exists a need in the art for advanced systems and methods for data processing.

BRIEF SUMMARY OF THE INVENTION

The present inventions are related to systems and methods for monitoring and/or reporting status related to out of order data processing, and more particularly to systems and methods for monitoring and/or reporting status related out of order data decoding.

Various embodiments of the present invention provide data processing systems that include an out of order data processing circuit and a monitor circuit. The out of order data processing circuit receives a first number of data sets, processes the received data sets out of order, and provides a second number of processed data sets. The monitor circuit includes an idle detection circuit, a data set counting circuit, and a status indicating circuit. The idle detection circuit is operable to assert an idle status signal upon determining that the out of order data processing circuit is idle. The data set counting circuit identifies a difference between the first number and the second number. The status indication circuit asserts a data set lost signal when the idle status signal is asserted and the data set counting circuit identifies a difference between the first number and the second number. In some instances of the aforementioned embodiments, the monitor circuit further includes a FIFO memory and an identifier comparator circuit. The FIFO memory stores FIFO identifiers received from the out of order processing circuit. Each of the FIFO identifiers identifies a respective one of the first number of data sets The identifier comparator circuit accesses the next FIFO identifier from the FIFO memory when one of the second number of data sets is output by the out of order processing circuit, compares the next FIFO identifier with an identifier associated with the one of the second number of data sets is output by the out of order processing circuit, and asserts an out of order flag when the comparison is not equal.

In various instances of the aforementioned embodiments, the out of order data processing circuit includes: a first data detection circuit that provides a first activity status signal; a second data detection circuit that provides a second activity status signal; a decoding circuit that provides a third activity status; and a data output circuit that provides a fourth activity status. In some cases, the idle detection circuit asserts the idle status signal when all of the first activity status, the second activity status, the third activity status and the fourth activity status are not active. In particular cases, the inactivity must continue over a defined period before the idle status signal is asserted.

In some instances of the aforementioned embodiments, the out of order data processing circuit includes: a first data detection circuit that provides a first activity status signal; and a data output circuit that provides a second activity status. In such cases, the data set counting circuit may be an up/down counter that is incremented upon assertion of the first activity status signal and decremented upon assertion of the second activity status signal. In one particular case, a count value provided by the up/down counter corresponds to the number of data sets received by the out of order data processing circuit less the number of data sets output by the out of order data processing circuit.

Various other embodiments of the present invention provide data processing systems that include an out of order data processing circuit and a monitor circuit. The out of order data processing circuit receives a first number of data sets, processes the received data sets out of order, and provides a second number of processed data sets. The monitor circuit includes a FIFO memory and an identifier comparator circuit. The FIFO memory stores FIFO identifiers received from the out of order processing circuit. Each of the FIFO identifiers identifies a respective one of the first number of data sets. The identifier comparator circuit accesses the next FIFO identifier from the FIFO memory when one of the second number of data sets is output by the out of order processing circuit, compares the next FIFO identifier with an identifier associated with the one of the second number of data sets output by the out of order processing circuit, and asserts an out of order flag when the comparison is not equal. In some cases, each of the FIFO identifiers is a number that uniquely identifies one of the first number of data sets from another of the first number of data sets. In some cases, the next FIFO identifier is identical to the identifier associated with the one of the second number of data sets output by the out of order processing circuit if the one of the second number of data sets is output in the same order that it was received.

Yet other embodiments of the present invention provide methods for monitoring out of order data processing. The methods include receiving a plurality of data sets that is associated with a plurality of identifiers with each of the plurality of identifiers indicates a respective one of the plurality of data sets; storing each of the plurality of identifiers in a FIFO memory in an order that the corresponding data sets of the plurality of data sets was received; processing the plurality of data sets such that at least one of the plurality of data sets is provided as an output data set; accessing the next available identifier from the FIFO memory; and asserting an out of order signal when the next available identifier is not the same as the identifier associated with the output data set.

In various instances of the aforementioned embodiments, the methods further include providing a data processing circuit that processes the plurality of data sets. The plurality of data sets is a first number of data sets, and processing the first number of data sets results in providing a second number of output data sets. A data lost signal is asserted when the first number is different from the second number. In particular cases, the methods further include determining that the data processing circuit is idle. In such cases, the data lost signal is asserted when the data processing circuit is idle.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for monitoring and/or reporting status related to out of order data processing, and more particularly to systems and methods for monitoring and/or reporting status related out of order data decoding.

Various embodiments of the present invention provide compact hardware solutions for decoding suitable for read channel, wireless transmission and other applications. The decoding circuitry includes a monitoring circuit that receives inputs from various data processing circuitry and provides status indicators regarding ongoing data processing. For example, in some embodiments of the present invention, status indicators are provided that indicate whether one or more data sets failed to complete processing and whether one or more data sets were improperly reported out of order. These status indicators may be reported to a host or other circuitry that oversee the ongoing processing.

Figure 1:
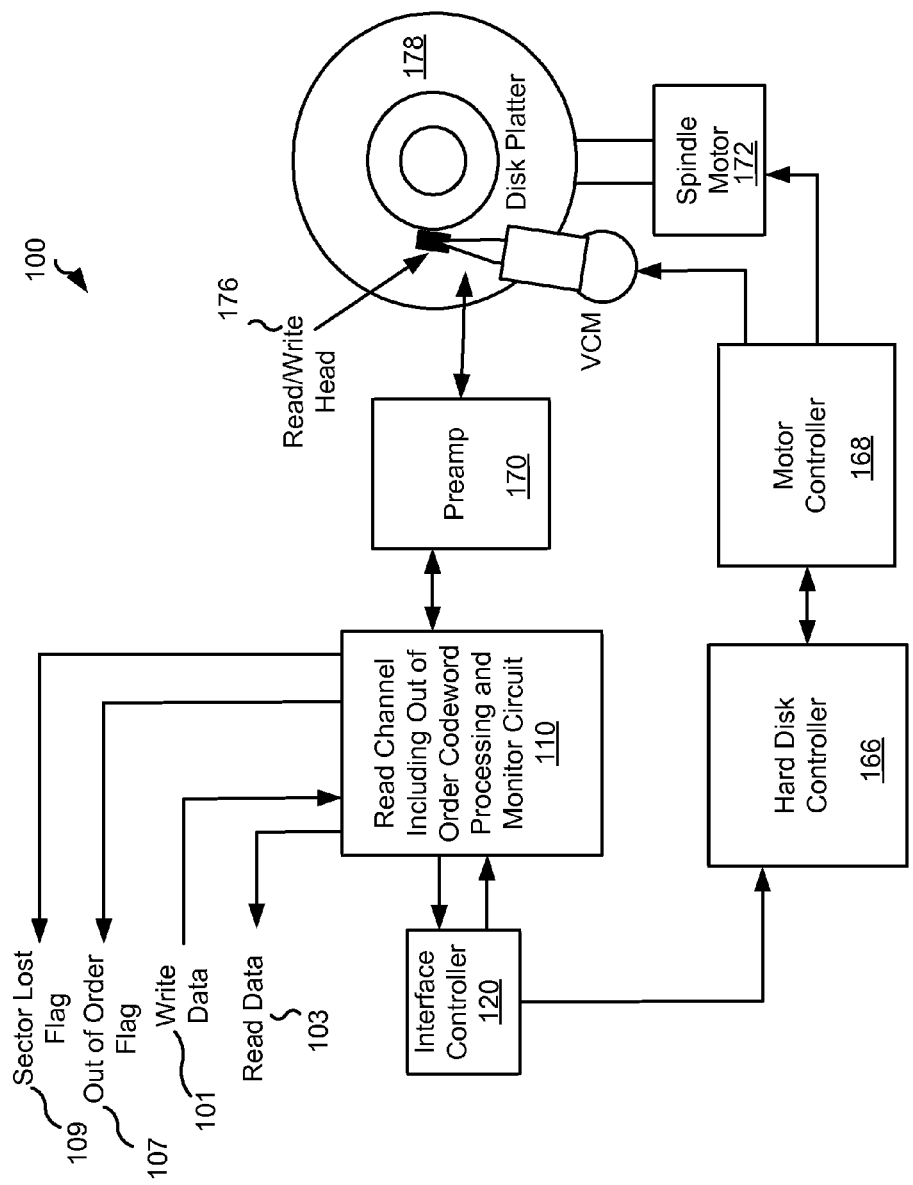
FIG. 1 shows a storage system with out of order codeword processing circuitry and a monitoring circuit in accordance with various embodiments of the present invention.

Turning to FIG. 1, a storage system 100 including read channel 110 with out of order codeword processing circuitry and a monitoring circuit is shown in accordance with various embodiments of the present invention. Storage system 100 may be, for example, a hard disk drive. Read channel 110 may include, but is not limited to, a data processing circuit similar to those described above in relation to FIG. 3 though 4 below. In some cases, the data processing circuit may operate similar to that described in relation to FIGS. 2a-2b.

Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with a perpendicular recording scheme. For example, the magnetic signals may be recorded as either longitudinal or perpendicular recorded signals.

In a typical read operation, read/write head assembly 176 is accurately positioned by motor controller 168 over a desired data track on disk platter 178. The appropriate data track is defined by an address received via interface controller 120. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel 110 via preamplifier 170. Preamplifier 170 is operable to amplify the minute analog signals accessed from disk platter 178. In turn, read channel module 110 decodes and digitizes the received analog signal to recreate the information originally written to disk platter 178. The read data is provided as read data 103. A write operation is substantially the opposite of the preceding read operation with write data 101 being provided to read channel module 110. This data is then encoded and written to disk platter 178.

There is an order to the data sets retrieved from disk platter 178. Where the order of the data sets provided as an output via read data 103 varies from the order of the data sets retrieved from disk platter 178, an out of order flag 107 is asserted. In addition, when processing in the out of order codeword circuitry becomes idle, it is determined whether the same number of data sets that were retrieved from disk platter 178 have been provided via read data 103. Where the number differs, a lost data set flag 109 is asserted.

Figure 2A:
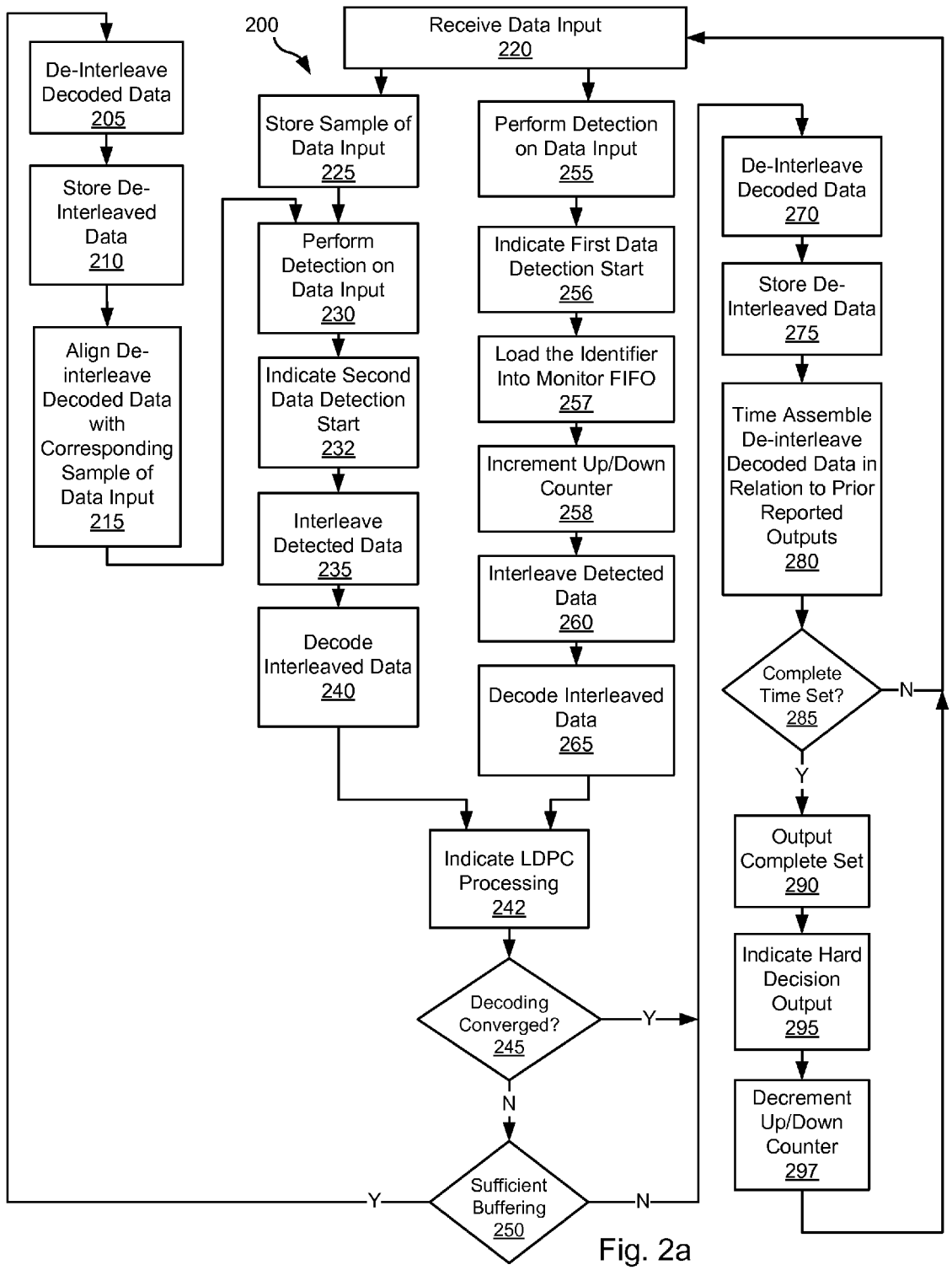
FIG. 2a is a flow diagram showing a method in accordance with some embodiments of the present invention for performing data processing including circuit status updating.

Turning to FIG. 2a, a flow diagram 200 shows a method in accordance with some embodiments of the present invention for performing data processing including circuit status updating. Following flow diagram 200, a data input is received (block 220). This data input may be, but is not limited to, a series of data bits received from a magnetic recording medium or a series of bits received from a transmission channel. These series of data bits may be grouped into data sets. These data sets may include data grouped into a particular format and are referred to as codewords. For example, the data sets may include data assembled for low density parity check (LDPC) decoding that may be referred to as LDPC codewords. The received data sets are associated with an identifier that may be used to differentiate one data set from another. These identifiers may be referred to herein as identifiers, tags or identifiers. Based on the disclosure provided herein, one of ordinary skill in the art will recognize a variety of sources and formats for the received data input. A sample of the received data is stored in a buffer and retained for later processing (block 225). In some cases, the data stored in the buffer is stored as a full sector of data, and the data buffer includes the ability to store multiple sectors of data.

Data detection processes are performed on the received data to yield a detected data set (block 255). A signal is asserted indicating that the first data detection process has started or is ongoing (block 256). In some embodiments of the present invention, the signal indicating the first data detection process is asserted the entire time that the first data detection circuit is receiving data. In other embodiments of the present invention, the signal indicating the first data detection process is pulsed once each time the data detection process is started. Based upon the disclosure provided herein, one of ordinary skill in the art will recognize a variety of methods for asserting the indication signal in accordance with different embodiments of the present invention. In addition, the identifier associated with the received data is stored to a monitor FIFO memory (block 257). In some embodiments of the present invention, the identifier is unique to any data set currently being processed. Yet further, an up/down counter is incremented (block 258). As more fully described below, the up/down counter is decremented whenever processing of a data set is completed. As such, the up/down counter indicates the number of data sets currently being processed that have not yet completed (i.e., the number of data sets received less the number of data sets output).

The detected data set is interleaved (block 260), and the interleaved data is decoded (block 265). In some embodiments of the present invention, the data decoding is an LDPC decoding process as is known in the art. In addition, a signal indicating that the decode processing has started or is ongoing is asserted (block 242). In some embodiments of the present invention, the signal indicating the decoding process is asserted the entire time that the decoding process is receiving data. In other embodiments of the present invention, the signal indicating the decoding process is pulsed once each time the decoding process is started. Based upon the disclosure provided herein, one of ordinary skill in the art will recognize a variety of methods for asserting the indication signal in accordance with different embodiments of the present invention. It is then determined whether the decoding process converged (block 245), and whether there is sufficient buffering available to reprocess the data (block 250).

Where either the decoding process converged (block 245) or there is insufficient buffering available (block 250), the decoded data is de-interleaved (block 270) and stored in a buffer (block 275). The buffer includes various processed data sets that may have become available out of order, and as such the various processed data sets are reordered in the buffer so that the completed data sets may be presented at the output in the same order that the unprocessed data sets were received at the input (block 280). It is then determined if a complete time set is available in the buffer (block 285). A complete time set includes every result corresponding to received inputs over a given period of time. Thus, for example, where the first result is delayed while two later results are reported, the complete time set exists for the three results once the first result is finally available in the buffer.

Where a complete time set is available (block 285), the processed data set(s) are output to a recipient (block 290).

In addition, whenever a hard decision is output (i.e., a processed data set is provided) (block 290), a signal indicating the hard decision output is asserted (block 295), and the up/down counter is decremented (block 297). Of note, the up/down counter is decremented once for each data set that is provided as an output, and the hard decision output indication signal is asserted and subsequently de-asserted once for each data set that is provided as an output.

Alternatively, where the decoding process failed to converge (block 245) and there is sufficient buffering available (block 250), the process of detection and decoding is repeated for the particular data set. In particular, the decoded data is de-interleaved (block 205) and the resulting de-interleaved data is stored to a buffer (block 210). The data is accessed from the buffer and the de-interleaved data is aligned with the corresponding sample of the data input that was stored as described above in relation to block 225 (block 215) once the data detector is available. The de-interleaved data and the corresponding sample data input is provided to the data detector where a subsequent data detection is performed (block 230) on the originally stored sample of data input (block 225) using the soft input developed in the earlier processing of the same data input (blocks 255, 260, 265, 245, 250, 205, 210, 215). A signal is asserted indicating that the second or subsequent data detection process has started or is ongoing (block 232). In some embodiments of the present invention, the signal indicating the second data detection process is asserted the entire time that the second data detection circuit is receiving data. In other embodiments of the present invention, the signal indicating the second data detection process is pulsed once each time the data detection process is started. Based upon the disclosure provided herein, one of ordinary skill in the art will recognize a variety of methods for asserting the indication signal in accordance with different embodiments of the present invention.

The result of the data detection process is interleaved (block 235) and the interleaved data is decoded (block 240). In addition, the signal indicating that the decode processing has started or is ongoing is asserted (block 242). In some embodiments of the present invention, the signal indicating the decoding process is asserted the entire time that the decoding process is receiving data. In other embodiments of the present invention, the signal indicating the decoding process is pulsed once each time the decoding process is started. Based upon the disclosure provided herein, one of ordinary skill in the art will recognize a variety of methods for asserting the indication signal in accordance with different embodiments of the present invention. At this point, it is determined whether the data detection and decoding process failed to converge (block 245) and is to be repeated, or whether the result converged (block 245) and is to be reported.

Figure 2B:
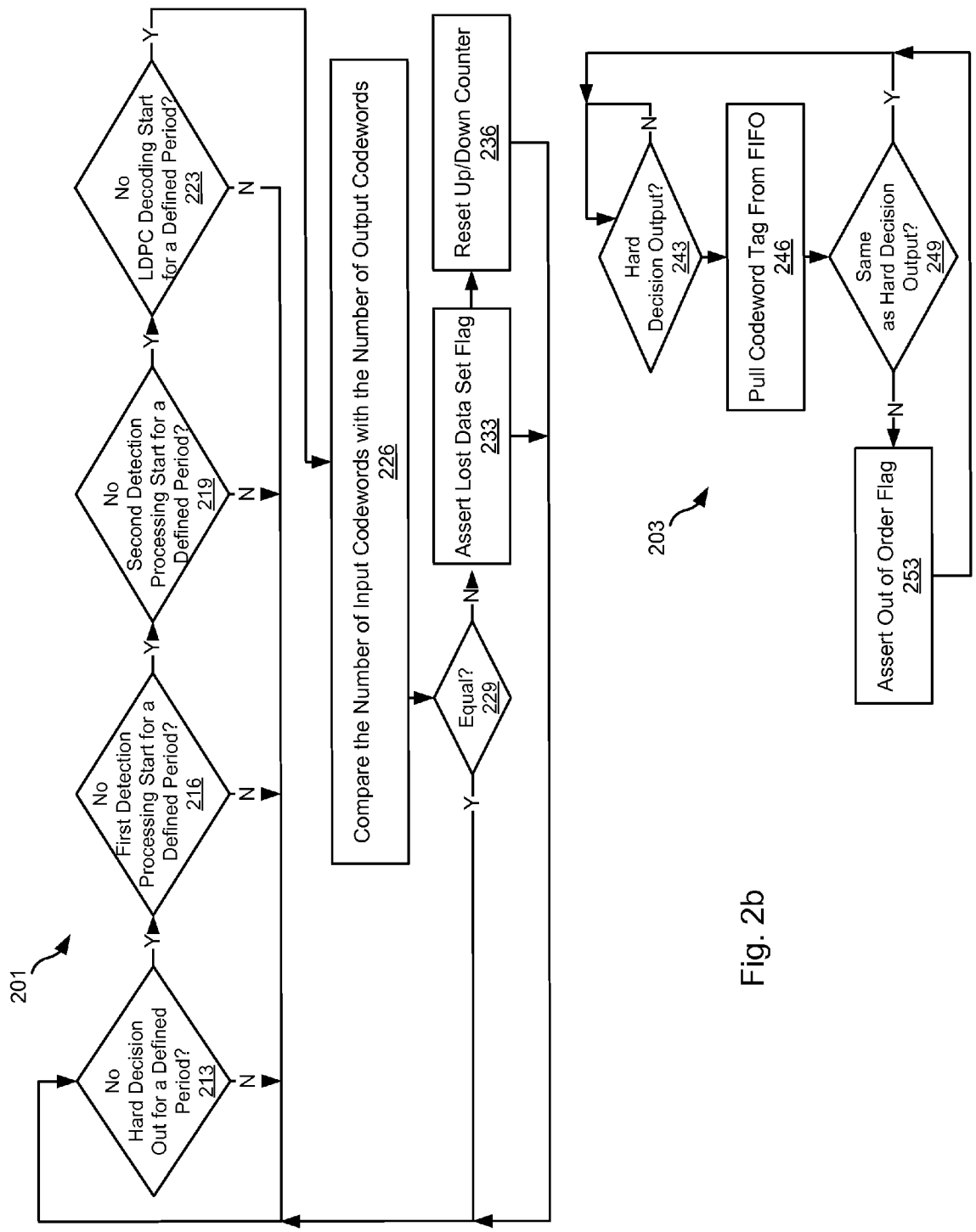
FIG. 2b are flow diagrams showing methods in accordance with some embodiments of the present invention for performing out of order data process monitoring.

Turning to FIG. 2*b*, a flow diagram 201 shows a method for detecting and reporting a lost data set in accordance with one or more embodiments of the present invention, and a flow diagram 203 shows a method for detecting and reporting an out of order data set in accordance with various embodiments of the present invention. Following flow diagram 201, it is determined whether any hard decision outputs have been provided within a defined period of time (block 213). This may be done by starting a timer each time the signal indicating the hard decision output is de-asserted, and determining whether the signal is re-asserted before a maximum count value is achieved. It is also determined whether the first detection processing is started within a defined period of time (block 216). This may be done by starting a timer each time the signal indicating the first data detection process is de-asserted, and determining whether the signal is re-asserted before a maximum count value is achieved. It is also determined whether the second detection processing is started within a defined period of time (block 219). This may be done by starting a timer each time the signal indicating the second data detection process is de-asserted, and determining whether the signal is re-asserted before a maximum count value is achieved. It is also determined whether the decoding process is started within a defined period of time (block 223). This may be done by starting a timer each time the signal indicating the decoding process is de-asserted, and determining whether the signal is re-asserted before a maximum count value is achieved. Where all of the aforementioned processes fail to indicate ongoing processing during the defined period (blocks 213, 216, 219, 223), it is assumed that processing within the monitored out of order data processing circuit is completed for a period.

At this point, it is convenient to determine whether any sectors or data sets were somehow lost during processing. This is done by comparing the number of input codewords with the number of output codewords (block 226). This can be done by determining whether the count value on the up/down counter is anything other than zero. Where the input count is the same as the output count (i.e., the value on the up/down counter is zero) (block 229), the process ends without asserting the indication of a lost data set. Otherwise, where the input count is not the same as the output count (i.e., the value on the up/down counter is not zero) (block 229), a signal indicating a lost data set is asserted (block 233), and the up/down counter is reset (bock 236). The asserted signal indicating the lost sector or data set is provided to a recipient.

Following flow diagram 203, it is determined whether a hard decision output has been provided from the monitored out of order data processing circuit (block 243). Where a hard output has been provided (block 243), the next identifier is pulled from the monitor FIFO into which the identifiers were stored when the corresponding codeword was received (block 246). As used herein, the term codeword is another name for a data set or sector. The identifier pulled from the monitor FIFO is compared with the identifier associated with the recent hard decision output (block 249). Where the processed data sets are being provided in the same order that they were received by the out of order data processing circuit, then the identifier pulled from the monitor FIFO will be the same as the identifier associated with the hard decision output. Where they are not the same, then some processed data set has been provided as an output that is out of order from that originally received. Where the identifiers are the same (block 249), the process ends without asserting a signal indicating out of order results. Otherwise, where the identifiers are not the same (block 249), the signal indicating out of order results (i.e., the out of order flag) is asserted (block 253).

Figure 3:
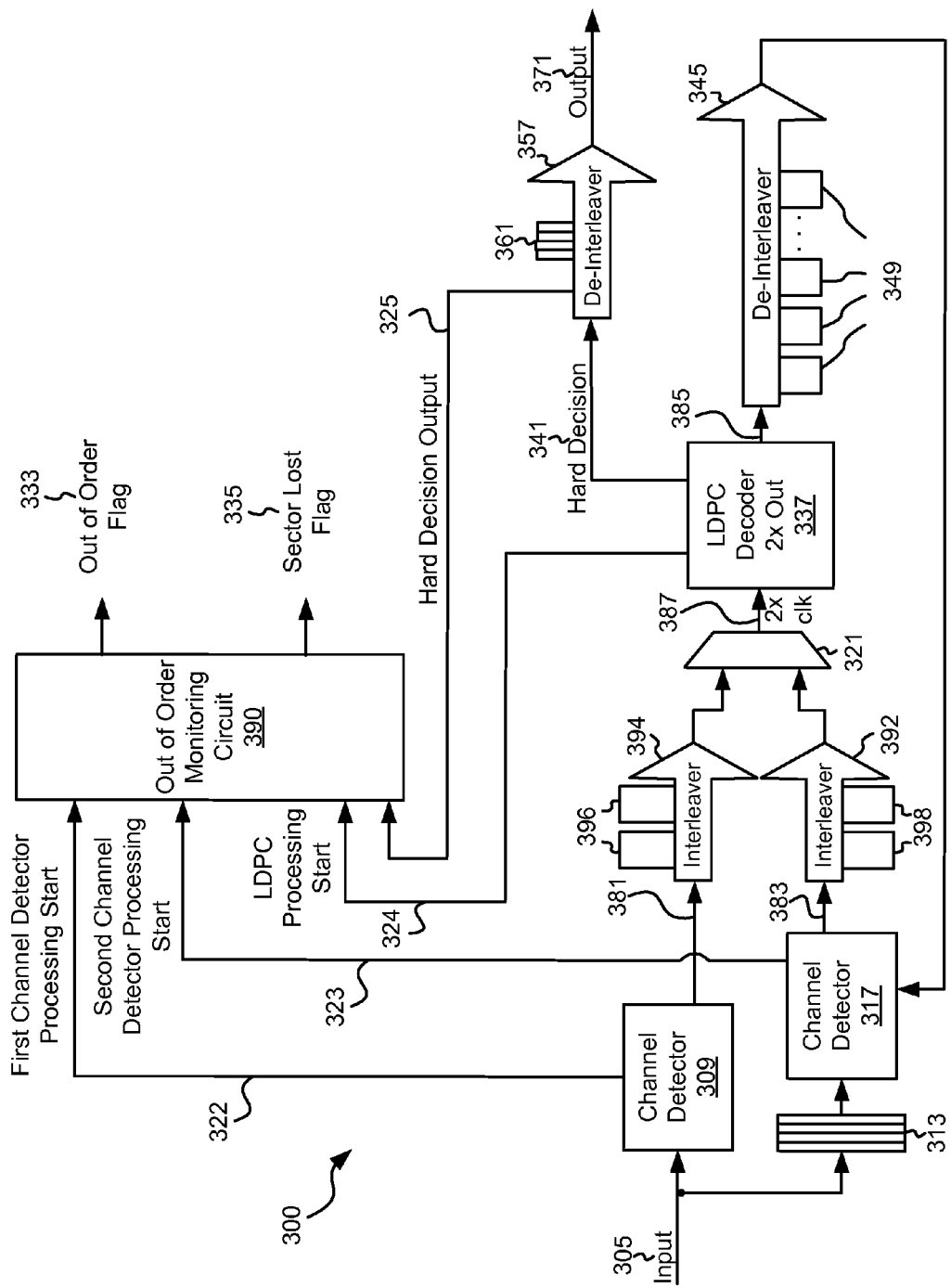
FIG. 3 shows a queuing detection and decoding circuit including out of order monitoring circuitry in accordance with various embodiments of the present invention.

Turning to FIG. 3, a queuing detection and decoding circuit 300 including out of order monitoring circuitry is shown in accordance with various embodiments of the present invention. Queuing detection and decoding circuit 300 includes a data input 305 that is fed to a channel detector 309. In some embodiments, data input 305 may be derived from a storage medium. In particular cases, data input 305 is provided as groups of data or data sets that are sometimes referred to as codewords. In the case of a hard disk drive, the received data sets may be sectors of data from the storage medium of the hard disk drive. Based upon the disclosure provided herein, one of ordinary skill in the art will recognize other sources for data input, and other data sets that may be processed in accordance with different embodiments of the present invention.

Channel detector 309 may be any type of channel detector known in the art including, but not limited to, a soft output Viterbi algorithm detector (SOVA) or a maximum a posteriori (MAP) detector. Based on the disclosure provided herein, one of ordinary skill in the art will recognize a variety of channel detectors that may be used in accordance with different embodiments of the present invention. In addition to performing a data detection process, channel detector 309 asserts a first channel detector processing start signal 322 when input 305 is received for processing. In some embodiments of the present invention, first channel detector processing start signal 322 is asserted the entire time that data detector 309 is receiving data. In other embodiments of the present invention, first channel detector processing start signal 322 is pulsed once each time the data detection process is started by channel detector 309. Based upon the disclosure provided herein, one of ordinary skill in the art will recognize a variety of methods for asserting the indication signal in accordance with different embodiments of the present invention.

In addition, data input 305 is provided to a memory buffer 313 that is designed to hold a number of data sets received from data input 305. The size of memory buffer 313 may be selected to provide sufficient buffering such that a data set provided via data input 305 remains available at least until a first iteration processing of that same data set is complete and the processed data is available in a queue buffer 349 as more fully described below. Memory buffer 313 provides the data sets to a channel detector 317. Similar to channel detector 309, channel detector 317 may be any type of channel detector known in the art including, but not limited to, a SOVA detector or a MAP detector. Again, based on the disclosure provided herein, one of ordinary skill in the art will recognize a variety of channel detectors that may be used in accordance with different embodiments of the present invention.

In addition to performing a data detection process, channel detector 317 asserts a second channel detector processing start signal 323 data is being received by channel detector 317. In some embodiments of the present invention, second channel detector processing start signal 323 is asserted the entire time that data detector 317 is receiving data. In other embodiments of the present invention, second channel detector processing start signal 323 is pulsed once each time the data detection process is started by channel detector 317. Based upon the disclosure provided herein, one of ordinary skill in the art will recognize a variety of methods for asserting the indication signal in accordance with different embodiments of the present invention.

An output 381 of channel detector 309 is provided to an interleaver circuit 394, and an output 383 of channel detector 317 is provided to another interleaver circuit 392. Interleaver circuit 394 interleaves the output of channel detector 309 using a ping pong buffer 396, and interleaver circuit 392 interleaves the output of channel detector 317 using a ping pong buffer 398. One of the buffers in ping pong buffer 396 holds the result of a prior interleaving process of the output from channel detector 309 and is unloaded to an LDPC decoder 337 via a multiplexer 321, while the other buffer of ping pong buffer 396 holds a data set from channel detector 309 that is currently being interleaved. Similarly, one of the buffers in ping pong buffer 398 holds the result of a prior interleaving process of the output from channel detector 317 and is unloaded to LDPC decoder 337 via a multiplexer 321, while the other buffer of ping pong buffer 398 holds a data set from channel detector 317 that is currently being interleaved.

It should be noted that other soft decision data decoders may be used in place of LDPC decoder 337 in different embodiments of the present invention.

LDPC decoder 337 is capable of decoding one or more data sets simultaneously. As an example, LDPC decoder 337 may be designed to decode an interleaved data set from ping pong buffer 396, to decode an interleaved data set from ping pong buffer 398, or to decode interleaved data sets from ping pong buffer 396 and ping pong buffer 398 simultaneously. The decoded data is either provided as a hard decision output 341 or to a de-interleaver circuit 345 that uses queue buffer 349 to de-interleave the decoded data and to store the de-interleaved data until channel detector 317 is available for further processing.

In addition to performing a data decoding process, LDPC decoder 337 asserts an LDPC processing start signal 324 when LDPC decoder 337 is receiving data for processing. In some embodiments of the present invention, LDPC processing start signal 324 is asserted the entire time that LDPC decoder 337 is receiving data. In other embodiments of the present invention, LDPC processing start signal 324 is pulsed once each time the LDPC decoding process is started by LDPC decoder 337. Based upon the disclosure provided herein, one of ordinary skill in the art will recognize a variety of methods for asserting the indication signal in accordance with different embodiments of the present invention.

Where the data converges, it is provided as a hard decision output 341. Alternatively, where the data fails to converge, the data is stored to queue buffer 349 until channel detector 317 is available for further processing. One of the buffers in queue buffer 349 holds the result of a prior de-interleaving process and is unloaded to channel detector 317, while another buffer of queue buffer 349 holds a decoded data set currently being de-interleaved, and one or more other buffers in queue buffer 349 maintain other non-converged data waiting for processing by channel detector 317. Non-converged data from queue buffer 349 is de-interleaved by de-interleaver 345 and passed to channel detector 317 that has access to the corresponding data set in memory buffer 313. The data detection performed by channel detector 317 is similar to that performed by channel detector 309. Hard decision output 341 is provided to a de-interleaver circuit 357 that de-interleaves the received hard decision output 341 and stores the de-interleaved result in one of a number of memory buffers 361. Ultimately, de-interleaver circuit 357 provides the de-interleaved data stored in memory buffers 361 as an output 371. One function of de-interleaver 357 is to re-order the processed data sets so that they can be provided as an output in the same order that the corresponding data sets were originally received. As each data set is pulled from memory buffers 361 and provided as an output 371, a hard decision output signal 325 is asserted.

Queuing detection/decoding circuit 300 allows for performance of a variable number of detection and decoding iterations depending upon the introduced data. Further, in some cases, considerable power savings may be achieved through use of queuing detection/decoding circuit 300. Yet further, in some cases, a faster LDPC decoder may be implemented allowing for an increased throughput where substantial first iteration data convergence exists as multiple iterations are not necessarily required. Yet further, by allowing results of LDPC decoder 337 to be reported out of order, upstream processing does not have to wait for the completion of downstream processing. Re-ordering of the out of order results may be done by queuing detection/decoding circuit 300 or by a downstream recipient of output 371.

Such out of order processing allows the possibility that one or more data sets may be improperly processed and not provided via output 371. In such a case, the total number of data sets provided via output 371 will be less than the total number of data sets presented via input 305. This is generally considered an error condition that is flagged by an out of order monitoring circuit 390. In particular, out of order monitoring circuit 390 receives first channel detector processing start signal 322, second channel detector processing start signal 323, LDPC processing start signal 324 and hard decision output signal 325. Based upon these signals, out of order monitoring circuit 390 determines that queuing detection/decoding circuit 300 is idle. At this time, out of order monitoring circuit 390 determines whether the total number of input data sets equals the total number of output data sets. Where the numbers are not equal, a sector lost flag 335 is asserted indicating the error condition.

Further, it is possible that during out of order processing, one or more data sets may be provided as an output 371 in an order that is different than the order of the data sets presented via input 305. In some cases, this may be considered an error condition that is flagged by out of order monitoring circuit 390. In particular, out of order monitoring circuit 390 receives first channel detector processing start signal 322 and hard decision output signal 325. Based upon these signals, identifiers (e.g., identifiers) associated with particular data sets are loaded into a monitor FIFO when the data sets are received and unloaded from the monitor FIFO where the data sets are provided via output 371. The identifier retrieved from the monitor FIFO is compared against the identifier associated with the data set being provided via output 371. Where the identifiers are identical, the data set provided via output 371 has been presented in the same order that it was received via input 305. Alternatively, where the identifiers are not identical, the data set provided via output 371 has been presented in an order that is different from the order that it was received via input 305. If such is the case, out of order monitoring circuit 390 an out of order flag 333 is asserted indicating the out of order condition.

In operation, a first data set is introduced via data input 304 to channel detector 309. Channel detector 309 performs its channel detection algorithm and provides both a hard output and a soft output to interleaver circuit 394 that interleaves the received data into one buffer of ping pong buffer 396. As the data detection process proceeds, channel detector 309 asserts first channel detector processing start signal 322. Interleaver 394 may interleave the data set by writing consecutive data into non-consecutive memory/buffer addresses based on the interleaver algorithm/mapping. Interleaved data is provided from the other buffer of ping pong buffer 396 to LDPC decoder 337 via multiplexer 321. LDPC decoder 337 performs a data decoding process. Where the decoding process converges, LDPC decoder 337 writes its output as hard decision output 341 to output data buffer 361 and the processing is completed for that particular data set. Alternatively, where the data does not converge, LDPC decoder 337 writes its output (both soft and hard) to queue buffer 349. The scheduling guarantees that there is at least one empty buffer for holding this new set of data, and this strategy assures that each data input is guaranteed the possibility of at least two global iterations (i.e., two passes through a detector and decoder pair). As the LDPC decoding process proceeds, LDPC decoder 337 asserts LDPC processing start signal 324.

Where the data decoding process applied by LDPC decoder converges, the converging result is provided as a hard decision 341 to one of the buffers in memory buffer 361. The outputs are re-ordered and presented as output 371. Each time a data set is provided as an output 371, hard decision output 325 is asserted.

Alternatively, where the data decoding process fails to converge, the non-converging data set is written to one of the buffers in queue buffer 349. Channel detector 317 selects the data set that corresponds to the output in queue buffer 349 from input data buffer 313 and performs a subsequent data detection aided by the soft output data generated by LDPC decoder 337 fed back from queue buffer 349. As the data detection process proceeds, channel detector 317 asserts second channel detector processing start signal 323. By using the previously generated soft data for data maintained in input data buffer 313, channel detector 317 generally performs a subsequent channel detection with heightened accuracy. The output of this subsequent channel detection is passed to interleaver circuit 392 that interleaves the received data into one buffer of ping pong buffer 398. Interleaver 392 may interleave the data set by writing consecutive data into non-consecutive memory/buffer addresses based on the interleaver algorithm/mapping. The interleaved data is provided from the other buffer of ping pong buffer 398 to LDPC decoder 337 via multiplexer 321. LDPC decoder 337 provides another decoding pass to the data. Similar to the first iteration, a decision is made as to whether the data converged. Where the data converged, LDPC decoder 337 writes its output as hard decision output 341 to output data buffer 361 and the processing is complete for that particular data set. Alternatively, where the data does not converge, LDPC decoder 337 writes its output (both soft and hard) to queue buffer 349 where it is processed using hard decision decoder 397 and passed back to channel detector 317 for another global iteration where such is necessary and possible.

In parallel, when out of order monitoring circuit 390 determines that there has not been activity on any of first channel detector processing start signal 322, second channel detector processing start signal 323, LDPC processing start signal 324 and hard decision output signal 325. Once determined, queuing detection and decoding circuit 300 is considered idle and out of order monitoring circuit 390 compares the number of data sets input via input 305 with the number of data sets output via output 371. Where the numbers are not equal, sector lost flag 335 is asserted. In addition, whenever hard decision output signal 325 is asserted, out of order monitoring circuit 390 compares the identifier or identifier associated with the data set output via output 371 with the expected identifier or identifier maintained in a memory in out of order monitoring circuit 390. Where the two identifiers are not equal, out of order flag 333 is asserted.

Figure 4:
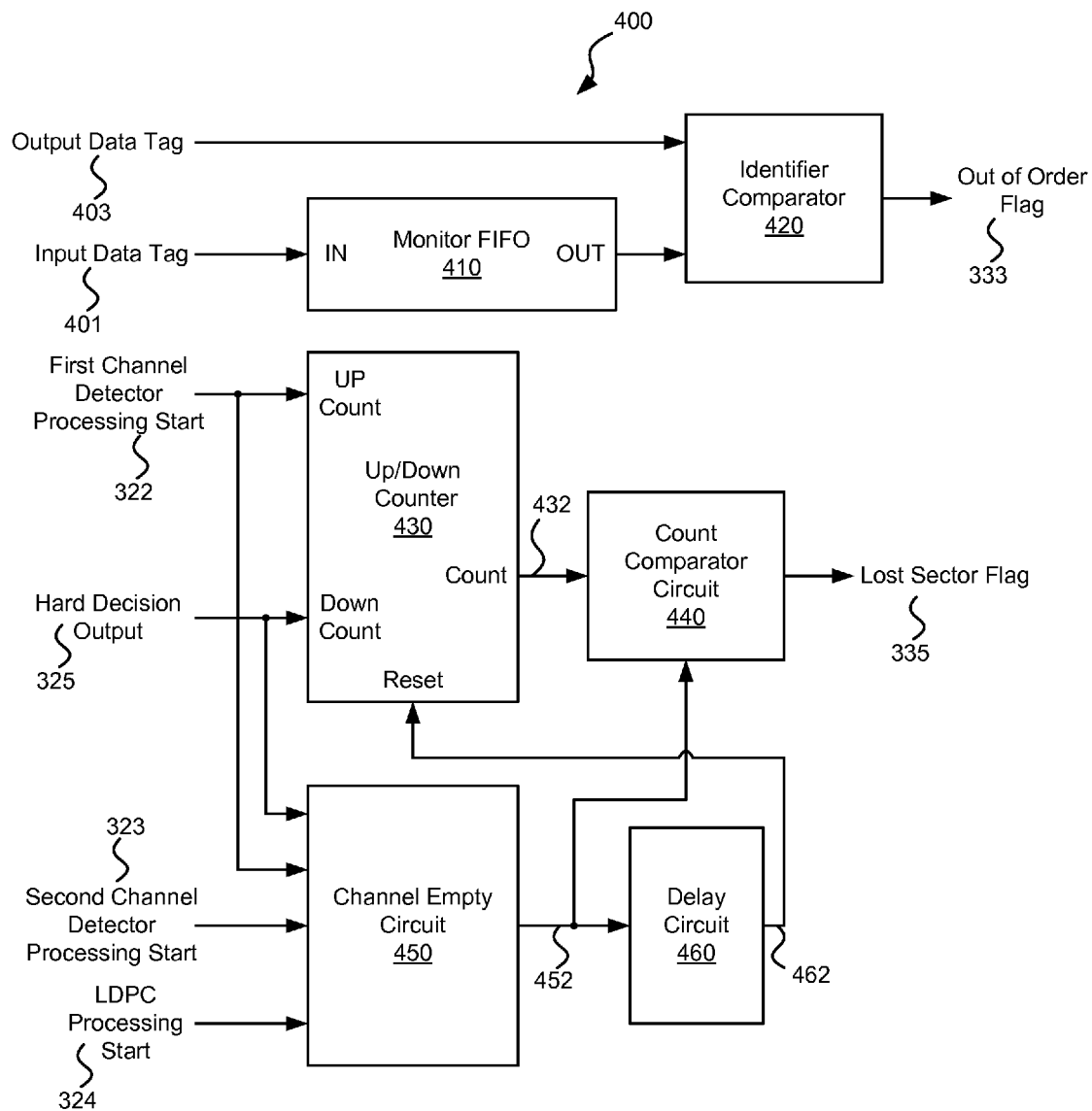
FIG. 4 depicts one implementation of an out of order monitoring circuit in accordance with various embodiments of the present invention.

Turning now to FIG. 4, one implementation of an out of order monitoring circuit 400 is shown in accordance with various embodiments of the present invention. Out of order monitoring circuit 400 may be used in place of out of order monitoring circuit 390 of FIG. 3. Out of order monitoring circuit 400 includes a monitor FIFO memory 410 that receives input data tags 401. The input data tags are identifiers or identifiers associated with a particular data set received via input 305. Monitor FIFO memory 410 provides such input data tags on a first in, first out basis to a identifier comparator circuit 420. The same identifiers stored to monitor FIFO memory 410 remain associated with the particular data set throughout the entire data processing cycle from reception via input 305 to production via output 371. Each time a data set is presented via output 371, the identifier associated with the output data set is provided to identifier comparator circuit 420 as an output data tag 403. Identifier comparator circuit 420 compares output data tag 403 with the next identifier pulled from monitor FIFO memory 410. Where the two identifiers are the same, the data set provided via output 371 is being provided in the same order that it was received via input 305. In such a case, identifier comparator circuit 420 does not assert out order flag 333. In contrast, where the two identifiers are not the same, the data set provided via output 371 is being provided in an order different from the order that it was received via input 305. In such a case, identifier comparator circuit 420 asserts out order flag 333.

Out of order monitoring circuit 400 additionally includes an up/down counter 430 and a channel empty circuit 450. Channel empty circuit 450 receives first channel detector processing start signal 322, second channel detector processing start signal 323, LDPC processing start signal 324 and hard decision output signal 325. Channel empty circuit 450 includes one or more timer circuits that are started and stopped based upon the activity on the inputs. Where no activity occurs for a defined period (e.g., a count value), a system idle signal 452 is asserted indicating that the channel is empty. System idle signal 452 is provided to a delay circuit 460 that provides a delayed system idle signal 462. Delayed system idle signal 462 is used to reset up/down counter 430.

Up/down counter 430 is incremented each time a data set is introduced for processing as indicated by an assertion of first channel detector processing start signal 322, and is decremented each time a data set is provided via output 371 as indicated by assertion of hard decision output signal 325. As up/down counter 430 is initially reset, a count value 432 of zero indicates that the same number of outputs and inputs occurred. When the system has completed processing and count value 432 is non-zero, there is an imbalance between inputs and outputs indicating a lost data set. In such a case, a count comparator circuit 440 asserts lost sector flag 335. Count comparator circuit 440 may be a multiplexer that asserts lost sector flag 335 at a logic '0' when system idle signal 452 is not asserted or when count value is zero, and asserts lost sector flag 335 at a logic '1' when both system idle signal 452 is asserted and count value is non-zero.

In conclusion, the invention provides novel systems, devices, methods and arrangements for monitoring out of order data processing. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A data processing system, the system comprising:
an out of order data processing circuit, wherein the out of order data processing circuit is operable to: receive a first number of data sets, process the received data sets out of order, and provide a second number of processed data sets; and
a monitor circuit, wherein the monitor circuit includes:
an idle detection circuit, wherein the idle detection circuit is operable to assert an idle status signal upon determining that the out of order data processing circuit is idle;
a data set counting circuit, wherein the data set counting circuit is operable to identify a difference between the first number and the second number; and
a status indication circuit, wherein the status indication circuit is operable to assert a data set lost signal when the idle status signal is asserted and the data set counting circuit identifies a difference between the first number and the second number.

2. The data processing system of claim 1, wherein the monitor circuit further includes:
   a FIFO memory, wherein the FIFO memory is operable to store FIFO identifiers received from the out of order processing circuit, and wherein each of the FIFO identifiers identifies a respective one of the first number of data sets; and
   an identifier comparator circuit, wherein the identifier comparator circuit is operable to: access the next FIFO identifier from the FIFO memory when one of the second number of data sets is output by the out of order processing circuit, compare the next FIFO identifier with an identifier associated with the one of the second number of data sets is output by the out of order processing circuit, and assert an out of order flag when the comparison is not equal.

3. The data processing system of claim 1, wherein the out of order data processing circuit includes:
   a first data detection circuit, wherein the first data detection circuit is operable to provide a first activity status signal;
   a second data detection circuit, wherein the second data detection circuit is operable to provide a second activity status signal;
   a decoding circuit, wherein the decoding circuit is operable to provide a third activity status; and
   a data output circuit, wherein the data output circuit is operable to provide a fourth activity status.

4. The data processing system of claim 3, wherein the idle detection circuit is operable to assert the idle status signal when all of the first activity status, the second activity status, the third activity status and the fourth activity status are not active.

5. The data processing system of claim 3, wherein the idle detection circuit is operable to assert the idle status signal when all of the first activity status, the second activity status, the third activity status and the fourth activity status are not active for a defined period.

6. The data processing system of claim 1, wherein the out of order data processing circuit includes:
   a first data detection circuit, wherein the first data detection circuit is operable to provide a first activity status signal; and
   a data output circuit, wherein the data output circuit is operable to provide a second activity status.

7. The data processing system of claim 6, wherein the data set counting circuit is an up/down counter, and wherein the up/down counter is incremented upon assertion of the first activity status signal and decremented upon assertion of the second activity status signal.

8. The data processing system of claim 7, wherein a count value provided by the up/down counter corresponds to the number of data sets received by the out of order data processing circuit less the number of data sets output by the out of order data processing circuit.

9. A data processing system, the system comprising:
   an out of order data processing circuit operable to provide a series of product data sets in an order different from the order that a corresponding series of input data sets was received depending upon a number of iterations to which each of the product data sets is subjected, wherein the out of order data processing circuit receives a first number of data sets, processes the received data sets out of order, and provides a second number of processed data sets; and
   a monitor circuit, wherein the monitor circuit includes:
      a FIFO memory, wherein the FIFO memory stores FIFO identifiers received from the out of order processing circuit, and wherein each of the FIFO identifiers identifies a respective one of the first number of data sets; and
      an identifier comparator circuit, wherein the identifier comparator circuit accesses the next FIFO identifier from the FIFO memory when one of the second number of data sets is output by the out of order processing circuit, compares the next FIFO identifier with an identifier associated with the one of the second number of data sets output by the out of order processing circuit, and asserts an out of order flag when the comparison is not equal.

10. The data processing system of claim 9, wherein each of the FIFO identifiers is a number that uniquely identifies one of the first number of data sets from another of the first number of data sets.

11. The data processing system of claim 9, wherein the next FIFO identifier is identical to the identifier associated with the one of the second number of data sets output by the out of order processing circuit if the one of the second number of data sets is output in the same order that it was received.

12. The data processing system of claim 9, wherein the monitor circuit further comprises:
   an idle detection circuit, wherein the idle detection circuit is operable to assert an idle status signal upon determining that the out of order data processing circuit is idle;
   a data set counting circuit, wherein the data set counting circuit identifies a difference between the first number and the second number; and
   a status indication circuit, wherein the status indication circuit asserts a data set lost signal when the idle status signal is asserted and the data set counting circuit identifies a difference between the first number and the second number.

13. The data processing system of claim 12, wherein the out of order data processing circuit includes:
   a first data detection circuit, wherein the first data detection circuit provides a first activity status signal; and
   a data output circuit, wherein the data output circuit provides a second activity status.

14. The data processing system of claim 13, wherein the data set counting circuit is an up/down counter, and wherein the up/down counter is incremented upon assertion of the first activity status signal and decremented upon assertion of the second activity status signal.

15. The data processing system of claim 13, wherein a count value provided by the up/down counter corresponds to the number of data sets received by the out of order data processing circuit less the number of data sets output by the out of order data processing circuit.

16. The data processing system of claim 12, wherein the out of order data processing circuit includes:
   a first data detection circuit, wherein the first data detection circuit provides a first activity status signal;
   a second data detection circuit, wherein the second data detection circuit provides a second activity status signal; and
   a decoding circuit, wherein the decoding circuit provides a third activity status; and
   a data output circuit, wherein the data output circuit provides a fourth activity status.

17. The data processing system of claim 16, wherein the idle detection circuit asserts the idle status signal when all of the first activity status, the second activity status, the third activity status and the fourth activity status are not active for a defined period.

18. A method for monitoring out of order data processing, the method comprising:
- receiving a plurality of data sets, wherein the plurality of data sets is associated with a plurality of identifiers, and wherein each of the plurality of identifiers indicates a respective one of the plurality of data sets;
- storing each of the plurality of identifiers in a FIFO memory in an order that the corresponding data sets of the plurality of data sets was received;
- processing the plurality of data sets using an out of order data processing circuit operable to provide a series of product data sets in an order different from the order that the plurality of data sets was received depending upon a number of iterations to which each of the product data sets is subjected, wherein at least one of the product data sets is provided as an output data set;
- accessing the next available identifier from the FIFO memory; and
- asserting an out of order signal when the next available identifier is not the same as the identifier associated with the output data set.

19. The method of claim 18, wherein the method further comprises:
- wherein the out of order data processing circuit processes the plurality of data sets, wherein the plurality of data sets is a first number of data sets, and wherein processing the first number of data sets results in providing a second number of output data sets; and
- asserting a data set lost signal when the first number is different from the second number.

20. The method of claim 19, wherein the method further comprises:
- determining that the out of order data processing circuit is idle; and
- wherein the data lost signal is only asserted when the out of order data processing circuit is idle.

* * * * *